Figure 1:
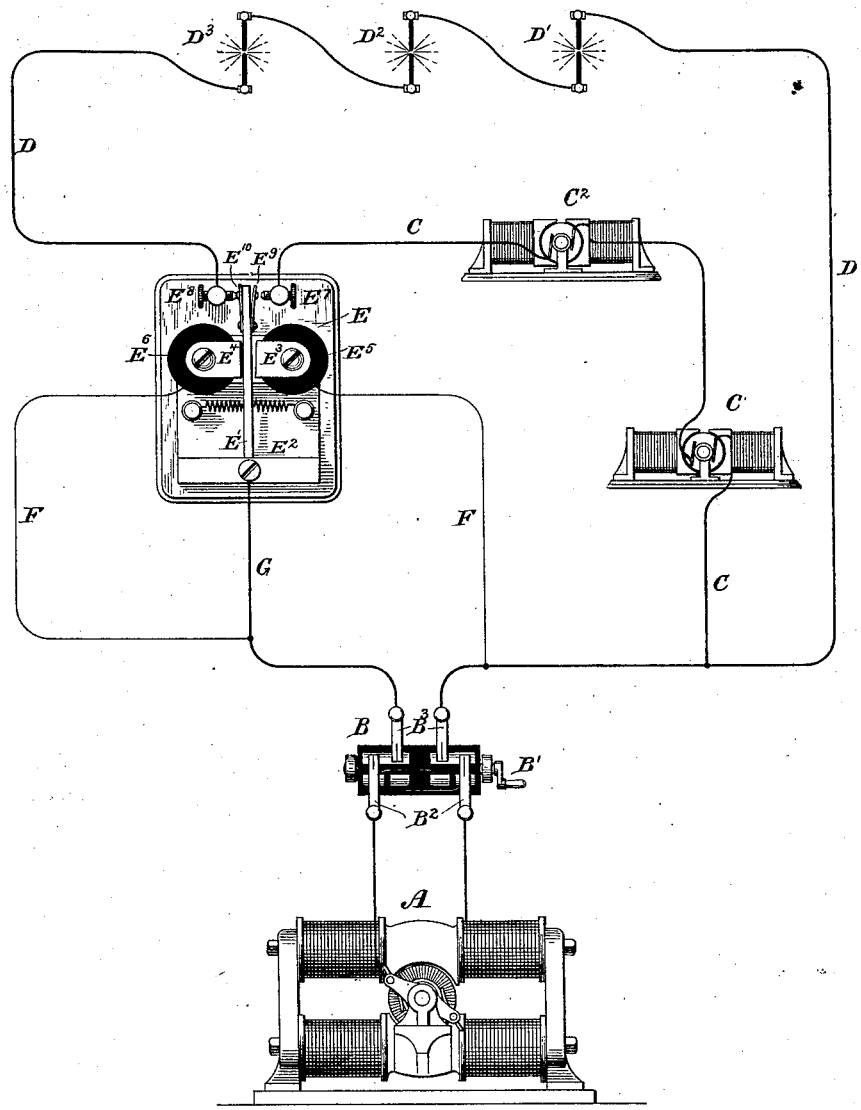

(No Model.)  2 Sheets—Sheet 1.

H. W. SPANG.
AUTOMATIC ELECTRIC SWITCH.

No. 281,937. Patented July 24, 1883.

WITNESSES
Wm A. Skinkle
Geo W. Breck

By his Attorneys
Pope Edgecomb & Butler

INVENTOR
Henry W. Spang.

(No Model.) 2 Sheets—Sheet 2.
H. W. SPANG.
AUTOMATIC ELECTRIC SWITCH.
No. 281,937. Patented July 24, 1883.
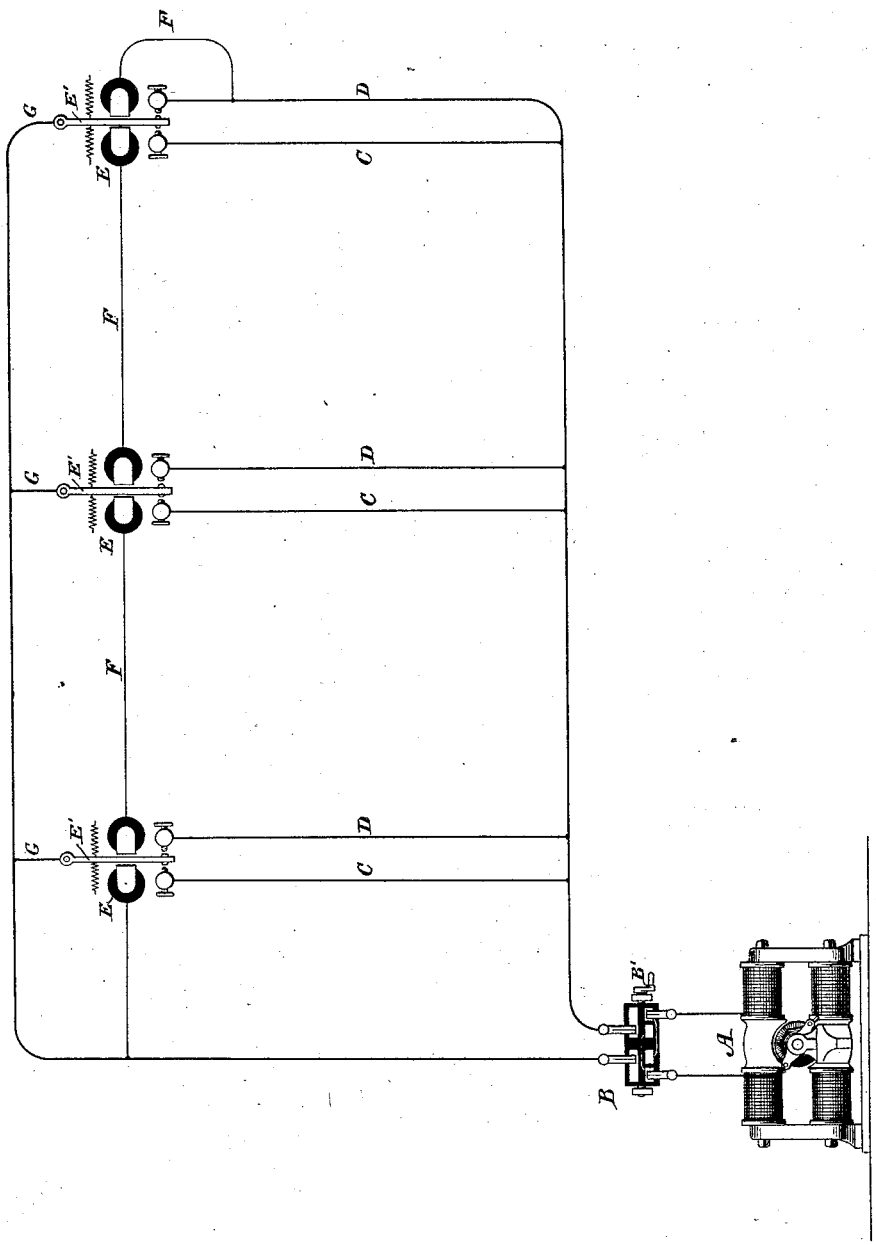
WITNESSES
Wm A. Skinkle
Geo W. Breck.
INVENTOR
Henry W. Spang,
By his Attorneys
Pope Edgecomb & Butler

UNITED STATES PATENT OFFICE.

HENRY W. SPANG, OF READING, PENNSYLVANIA.

AUTOMATIC ELECTRIC SWITCH.

SPECIFICATION forming part of Letters Patent No. 281,937, dated July 24, 1883.

Application filed January 26, 1883. (No model.)

*To all whom it may concern:*

Be it known that I, HENRY W. SPANG, a citizen of the United States, residing at Reading, in the county of Berks and State of Pennsylvania, have invented certain new and useful Improvements in Automatic Electrical Switches, of which the following is a specification.

My invention relates to the automatic direction of electrical currents, and to the devices that may be employed to effect such direction.

It particularly relates to improved devices whereby an electric current may be directed at will through one or other of two separate channels by merely changing the polarity of the current without modifying its strength or other conditions.

The field in which I apprehend my invention will be most useful is in connection with the distribution of currents for electric-lighting and power-transmission purposes. Thus, if it is desired to keep the generator of the central station in continuous operation, and to utilize currents during the night-time upon a conductor or conductors, including a number of electric lights, and during the day-time upon a conductor including in its course other forms of translating devices—such as motors, telegraph-instruments, &c.—by the application of this invention it will be only necessary to reverse the current at the central station to divert it from the night-wire to the day-wire, or vice versa.

In brief, my invention may be described as follows: The helices of a polarized electro-magnet are included in a branch of the main circuit of an electric generator. By means of changes in the direction of the current traversing this branch or shunt circuit, the polarized armature of the electro-magnet may be brought into contact with one or other of the terminals of two independent lines both connected to the same pole of the generator, and each including one or more devices for electric actuation. The said polarized armature being connected to the other pole of said generator, the main circuit will be thus completed through one of said lines. By reversing the current the polarized armature will be brought into contact with the terminal of the other line, and thus a means of independently actuating the devices in either line is afforded.

My invention is illustrated in the accompanying drawings, in which Figure 1 is a theoretical diagram, designed to show the principle of this invention rather than the exact form of mechanism to be employed. Fig. 2 shows the principle as extended to several systems such as that shown in Fig. 1.

A is a generator of electric currents.

B is a pole-changer of any suitable form. I have shown a form similar to that described in Letters Patent No. 180,282, granted to me on the 25th day of July, 1876, entitled "Improvement in Fire-Alarm Telegraphs." It is operated by the crank B', so that the electric current from the generator A may be supplied to an electric circuit, connecting the contact-springs $B^2$ $B^3$ in either direction at pleasure.

C and D are two lines of conductors uniting with the contact-spring $B^2$. In these lines may be included any translating devices desired, it being preferable that the two lines should be of approximately the same resistance or of resistances in the inverse proportion to the strength of current which they severally require for the proper actuation of the devices which they include. In the line C, I have shown motors C' and $C^2$, and in the line D electric lights D', $D^2$, and $D^3$. I will hereinafter refer to these lines as the day and night lines, respectively.

E is a polarized magnet substantially in the form commonly made use of in telegraph systems, the armature E' of which is polarized by its contact with the permanent magnet $E^2$.

$E^3$ and $E^4$ are cores of soft iron, each partaking of a polarity opposite to that of the armature, and each tending to attract and retain said armature. These cores are surrounded by helices $E^5$ $E^6$, included in the circuit of the shunt-conductor F F, spanning the working part of the circuit. The armature E' is connected by conductor G to the contact-spring $B^3$. This armature plays between the contact-stops $E^7$ $E^8$, to which the lines C D are respectively connected.

The operation of the mechanism thus described is as follows: By operating the pole-changer B, a sufficient volume of current will traverse the shunt F to actuate the polarized armature E'. Assuming that the armature is in contact with the stop $E^7$, by virtue of the attraction of the core $E^3$, the main circuit will be completed through the day-line. If, then, the current be reversed, the core $E^3$ will be neutralized and the core $E^4$ intensified; hence will the armature $E^7$ move over to the contact-stop $E^8$ and the current will traverse the night-line. In Fig. 2, I have shown a number of such systems operated by a single generator and controlled by a single pole-changer. It is evident from an inspection of this figure that a current in one direction will throw all the armatures in one direction, thereby closing all of the day-lines. A reversal of the current will cause the current to traverse all the night-lines, in the manner described.

The details of construction of the apparatus by which this invention is to be carried out will suggest themselves to any one skilled in the art, and do not therefore require minute description.

I am aware that the use of automatic electro-mechanical switches has been suggested, and that the polarized armature has been made use of for this general purpose; but the plan has been heretofore to include the helices of the electro-mechanical switch in the main circuit, and not in a shunt-circuit, as herein set forth. By introducing said helices into the shunt-circuit, two decided advantages are secured, namely:

First. The helices are withdrawn from the circuit in which the devices to be electrically operated are placed, and hence it is not necessary to overcome the resistances of said helices by increasing the strength of the main current, as heretofore. For this reason they may be made of fine wire, offering a considerable resistance.

Secondly. The high-resistance shunt, which in my system spans the contact-points $E^7 E^8$, acts to greatly diminish the sparks caused when the polarized armature breaks contact with either point.

In order that the fine-wire helices may never be traversed by the entire current, a device such as is shown in Fig. 1 may be conveniently employed. The actual contact-points of the armature $E^7$ are affixed to springs $E^9 E^{10}$. These springs are attached to the armature in such manner that when the armature is actuated the new contact is made before the old one is broken, and hence the main circuit is never opened.

I claim as my invention—

1. The combination, substantially as hereinbefore set forth, of the shunt-circuit of an electric generator, the conductors of the two main circuits, and a device actuated by currents traversing said shunt-circuit in one direction to close one of said main circuits, and by currents of opposite direction to close the other of said main circuits.

2. The combination, substantially as hereinbefore set forth, of the shunt-circuit of an electric generator, the coils of a polarized magnet included in said shunt-circuit, the vibrating armature of said polarized magnet, and two main circuits, one closed about the poles of said generator by said armature on its forward stop, the other closed by said armature on its back stop.

3. The combination, substantially as hereinbefore set forth, of a line of conductors equipped with electric lights, a second line of conductors equipped with devices other than electric lights, the shunt-circuit of a generator, the coils of a polarized magnet included in said shunt-circuit, and the polarized armature for closing one or other of said lines of conductors about the poles of said generator.

4. The combination, substantially as hereinbefore set forth, of a generator of electrical currents, a pole-changer, a closed shunt-circuit, the magnetizing-coils of a polarized magnet included in said shunt-circuit, the polarized armature, the two limiting-stops of said armature, and the two lines of main conductors independently and respectively closed about the poles of said generator by said armature.

In testimony whereof I have hereunto subscribed my name this 20th day of January, A. D. 1883.

HENRY W. SPANG.

Witnesses:
DANIEL SPANG,
ISAAC Y. SPANG.